June 9, 1931. B. W. WILLIG 1,809,500
LIFT MECHANISM FOR AGRICULTURAL IMPLEMENTS
Filed Aug. 20, 1929 3 Sheets-Sheet 3
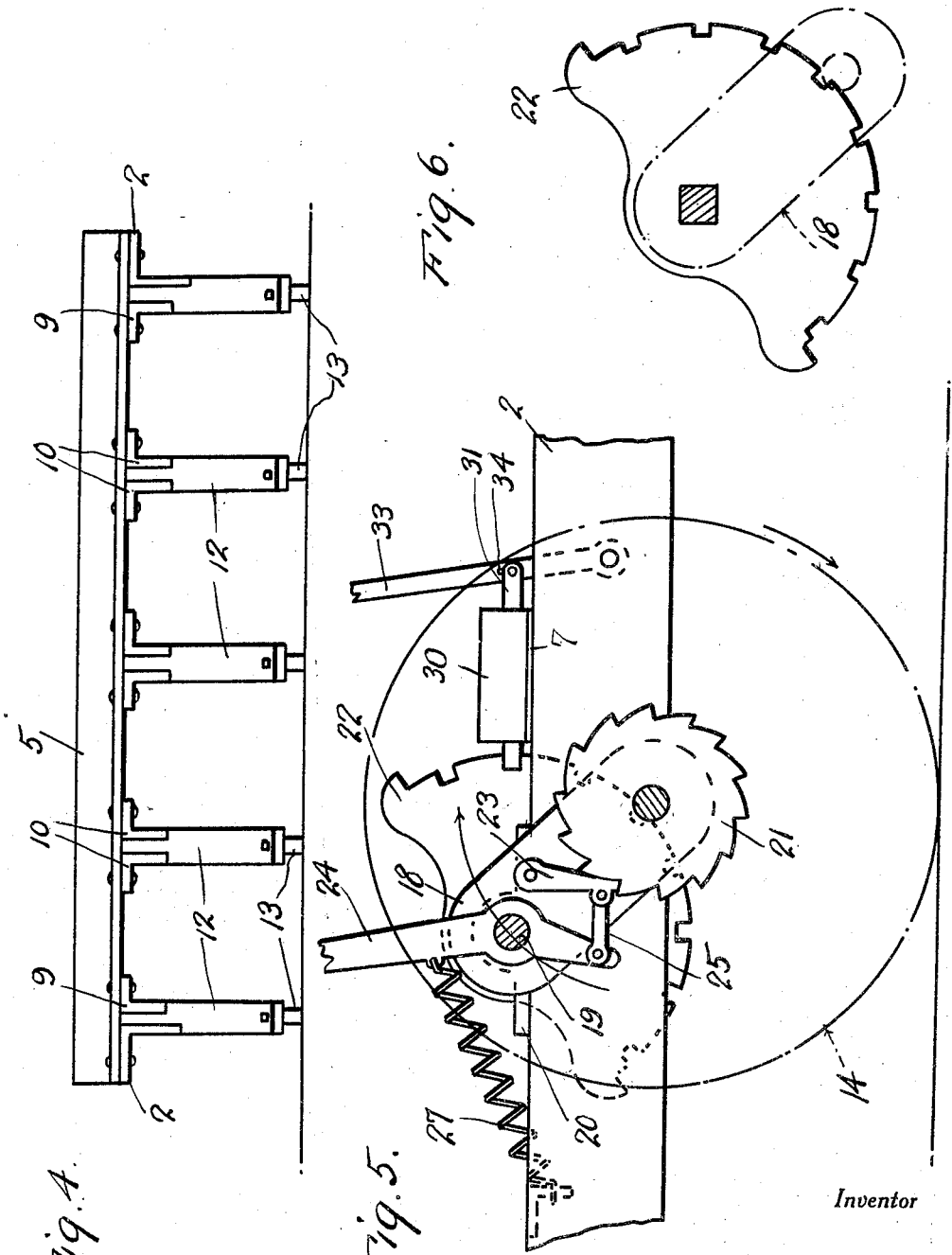
Inventor
Bruno W. Willig
By Clarence A. O'Brien
Attorney Patented June 9, 1931

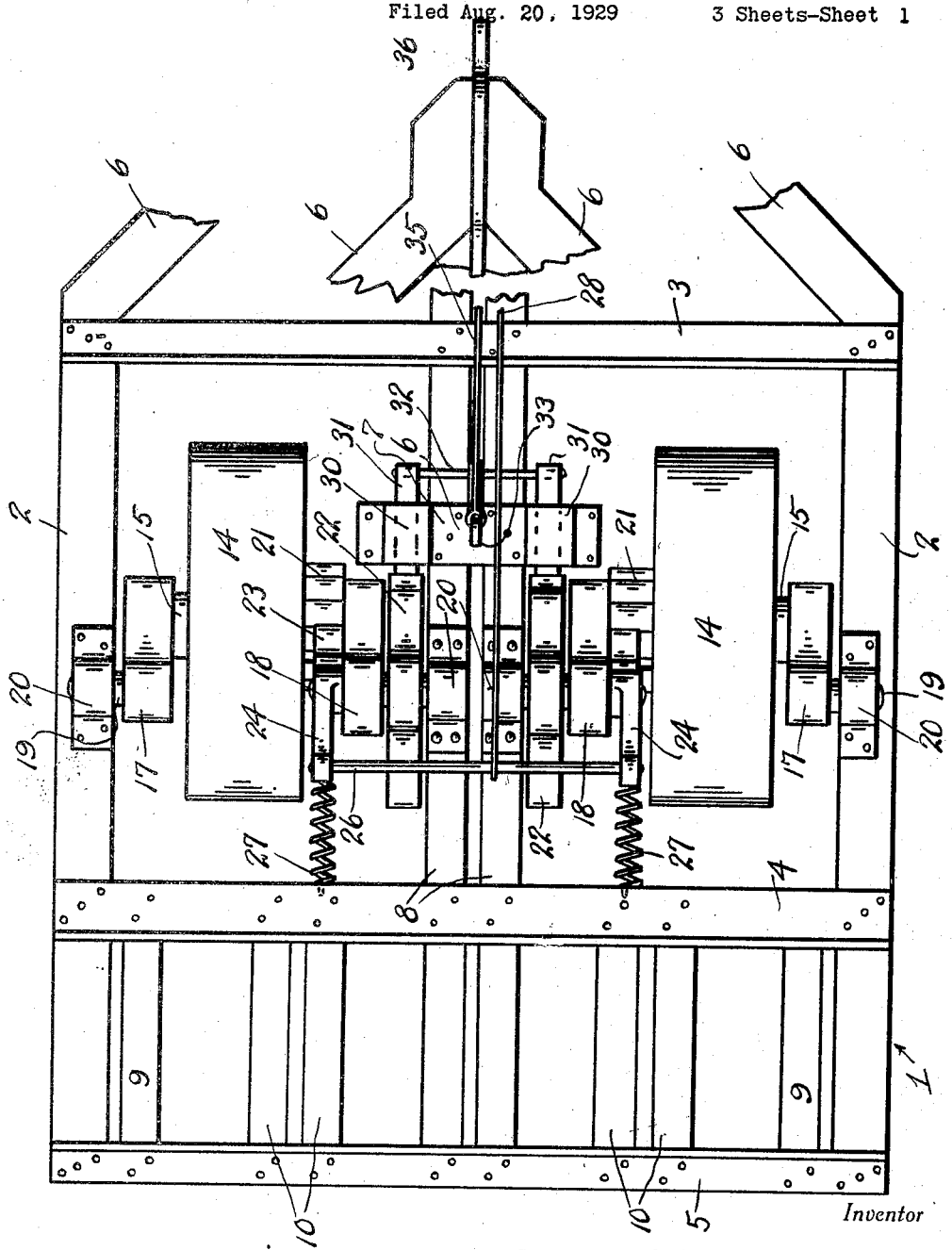

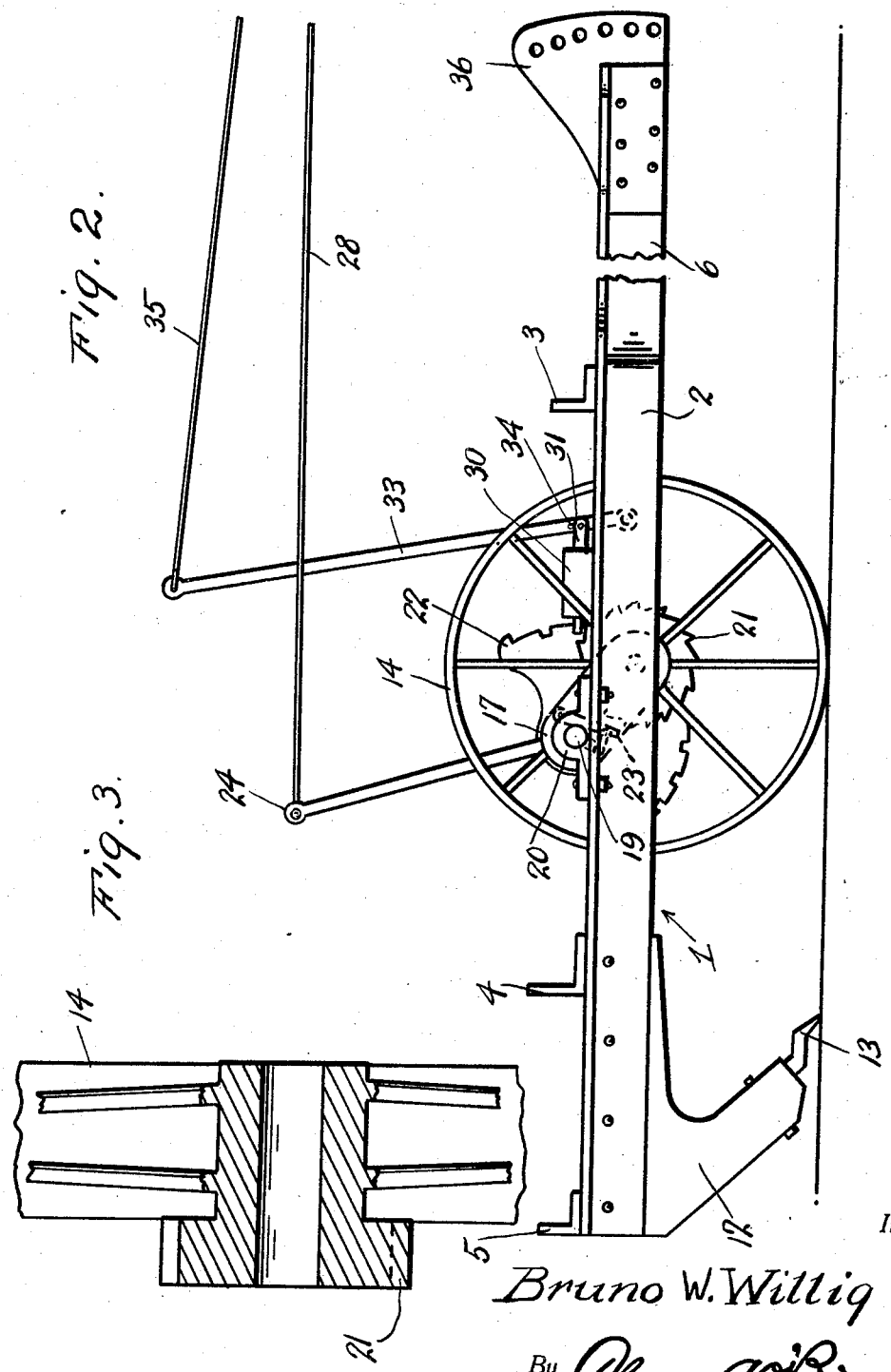

1,809,500

UNITED STATES PATENT OFFICE

BRUNO W. WILLIG, OF SAN ANGELO, TEXAS

LIFT MECHANISM FOR AGRICULTURAL IMPLEMENTS

Application filed August 20, 1929. Serial No. 387,107.

This invention relates to agricultural implements or machines and more particularly to devices of this character which are mounted on wheels and have embodied therewith means for raising and lowering the frame and earth working elements with respect to the ground, power for actuating the lifting mechanism being derived from the wheels as the same roll over the ground, wherein said implement is especially adapted to be attached to a tractor.

One of the objects of the invention is to provide, in a manner as hereinafter set forth, a machine of the aforementioned character having power mechanism adapted to be operated and controlled from a remote point, as by the operator of the tractor to which the implement is attached for the purpose of drawing the same over the ground.

Another object of the invention is to provide, in a manner as hereinafter set forth, an agricultural implement of the aforementioned character which will be simple in construction, strong, durable, efficient in its use, and which may be manufactured at low cost.

Other objects and advantages of the invention will be apparent from a study of the following specification, taken in connection with the accompanying drawings, wherein like reference characters designate corresponding parts throughout the several views, and wherein:

Figure 1 is a top plan view of an agricultural machine, said view illustrating an implement known as a scarifier the front portion of the frame of which is shown partially broken away.

Figure 2 is a side elevation of an agricultural machine constructed in accordance with this invention.

Figure 3 is a fragmentary view, partly in section of the rim and spoke, as well as the hub of one of the wheels, said hub being shown entirely in section and having formed integrally therewith an annular ratchet.

Figure 4 is a rear elevation of the earth scarifying elements, showing the manner of mounting the same on the implement frame.

Figure 5 is a vertical longitudinal sectional view showing the mechanism for raising and lowering the frame with respect to the ground.

Figure 6 is a detail side elevation of one of the elements for retaining the machine in its adjusted position.

Referring to the drawings, the reference character 1 designates generally the frame comprising the side bars 2, the forward cross bar 3, a pair of spaced rear cross bars 4 and 5, and the pair of forwardly converging bars 6. The cross bars 3, 4 and 5 are mounted and secured upon the upper side of the side bars 2. A pair of parallel spaced bars 8 extend from the rear across bar 5 through the longitudinal center of the frame 1 and are connected at their forward ends to the converged ends of the bars 6 and are positioned beneath the cross bars 3, 4 and 5 and connected thereto at the point of intersection therewith. All of the aforementioned elements are of angle iron of substantially L-shaped cross section and the vertical portions of the bars 3, 4 and 5, are preferably upstanding with respect to the horizontal portions thereof and the vertical portions of the side bars 2 extend from the horizontal portions thereof and are on the inner marginal edges thereof.

The vertical portions of the longitudinally extending central bars 8 depend from the adjacent inner edges of said bars. A transverse plate 7 is mounted on the bars 8 between the cross bars 3 and 4. A pair of angle irons or bars 9 are secured to the under side of the bars 4 and 5, in spaced parallel relation to those portions of the side bars 2, which are between said bars 4 and 5, the depending vertical portions of said angle bars 9 opposing, in spaced relation, the adjacent depending vertical portions of said side bars. Intermediate the bars 9 pairs of parallel, spaced angle bars 10 are supported at their opposite ends by the cross bars 4 and 5 and have their depending vertical portions in opposed spaced relation with respect to each other. It will be here noted that the rear ends of the longitudinal bars 8, which extend between the cross bars 4 and 5 constitute a centrally disposed pair of angle irons intermediate said cross bars and similar to the pairs 10.

A plurality of feet or holders 12 are bolted between the pairs of bars 10, between the bars 8 intermediate the cross bars 4 and 5 and between the bars 9 and the side bars 2. Earth scarifying elements 13 are detachably bolted to the lower ends of the feet 12. All of the foregoing is clearly illustrated in Figures 1, 2 and 4 of the drawings.

A pair of wheels 14 are enclosed in the frame 1, inwardly of the side bars 2 and between the cross bars 3 and 4, said wheels being supported on transversely aligned crank axles 15, having right angularly disposed arms 17 at the outer ends thereof and similarly constructed right angularly disposed arms 18 at their inner ends, said arms 17 and 18 being provided at their free ends by the integral angularly disposed trunnions or stub axles 19 which are rotatably mounted on the frame 1 and longitudinal bars 8, by means of bearing boxes 20. The wheels 14 are loosely mounted on the axles 15.

As most clearly illustrated in Figure 3 of the drawings, the hub portions of the wheels 14 are provided on their inner ends with annular ratchets 21, which abut the arms 18. Keyed rigidly to the trunnions 19 which are supported on the longitudinal bars 8 are the toothed segments 22 which are mounted on said trunnions intermediate the arms 18 and bars 8, as clearly shown in Figure 1.

A pair of pawls 23 are pivotally mounted on the outer sides of the arms 18, and are adapted for engagement with the ratchets 21. Also secured to the outer sides of the arms 19 at a point above the pawls 23 are the pivoted levers 24 having their lower ends coupled to the pawls 23 by means of links 25. The upper ends of the levers 24 are connected with each other by means of the cross rod 26. A pair of coil spings 27 have one end connected to the cross bar 4 of the frame 1 and their opposite ends connected to the levers 24 at a point above their pivotal connection with the arms 18. An actuating cable 28 is secured to the cross bar 26 and extends forwardly to a point within reach of the operator of the tractor to which the implement is attached. If desired, an extension lever 29 may be attached to the cross rod 26 intermediate its ends and the cable 28 may be attached to the upper free end of said extension lever for the purpose of obtaining full leverage, as illustrated in Figure 2.

A pair of latch bolt housings or casings 30 are mounted on the longitudinally extending bars 8, at a point forwardly of the toothed segments 22, and extends laterally from said bars as seen in Figure 1. Supported in the casing 30 is a pair of slidable keepers or bolts 31, the rear ends of which are adapted to seat in the notches in the segments 22 and the forward ends of which project forwardly from the casing and are provided at their forward ends with a connecting rod 32. A bolt operating lever 33 is pivotally mounted between the bars 8 and is provided, at a point above the said bars 8, with a longitudinal slot 34 through which the bolt connecting rod 32 extends. An operating cable 35 is connected to the upper end of the lever 33 and extends forwardly to a point within reach of the operator of the tractor. Coupling means 36 of a conventional type is provided at the forward ends of the bars 6 for the purpose of adjustably connecting the implement with the tractor.

The operation of the machine is as follows:

Assuming the implement to be coupled to a suitable draft implement such as a tractor, the cable 28 is pulled forward against the tension of the springs 27 for the purpose of maintaining the pawls 23 in disengaged position with respect to the ratchets 21 through the medium of bar 26, levers 24 and the links 25. It may be here mentioned that a pair of coil springs, not shown, are positioned in the casings 30 and yieldingly urge the bolts 31 into the notches of the segments 22.

In lieu of springs in the casings 30, a suitable spring, also not shown, may be attached to the lever 33 and have its free end attached to any suitable place on the frame in a manner to pull the lever 33 rearwardly and thus maintain the bolts 31 in engagement with the segments 22, as will be obvious. The cable 35 is normally slack and therefor the bolts 31 engage the segments 22 which are keyed to the inner trunnions 19 and thus prevent rotary movement of the trunnions 19, arms 17 and 18 and the crank axles 15. It is here pointed out that the arms 17 and 18, trunnions 19, and crank axles 15 constitute cranks, upon which the wheels 14 are mounted. In this position, the wheels 14 are free to rotate on the axles 15, and the implement is free to be rolled over the ground in any adjusted position.

Should it be desired to raise or lower the implement frame with respect to the ground, the operator exerts a pull on the cable 35 thus drawing the bolts 31 away from the segments 22 through the medium of the lever 33 and the connecting rod 32 for the purpose of permitting rotation of the trunnions 19 in the bearings 20. The cable 28 is then released and the springs 27 draw the levers 24 rearwardly and shift the lower ends thereof forwardly, thus forcing the pawls 23 into engagement with the ratchets 21 through the medium of the links 25, and in this manner the axles 15, arms 17 and 18, and trunnions 19 are coupled to the wheels 14 on which the ratchets 21 are mounted. It will thus be obvious that rotation of the wheels 14 will swing the crank axles 15 in a circular path thus elevating the frame 1. When the frame 1 is at the desired elevation, the operator pulls on the cable 28, thus releasing the pawls 23 from the ratchets 21, and simultaneously he replaces the cable 25 for the purpose of permitting the bolts 31 to engage the segments 22 for locking the mechanism in its adjusted position.

It is believed that the many advantages of an implement constructed in accordance with this invention will be readily understood, and although the preferred embodiment of the invention is as illustrated and described, it is to be understood that changes in the details of construction may be had which will fall within the scope of the invention as claimed.

What is claimed is:

1. An agricultural implement of the character described comprising a frame, a pair of crank axles mounted for rotation on said frame in transverse alignment, toothed segments rigidly secured to said crank axles, shiftable latch bolts supported on said frame and normally engaging said segments, said segments and latch bolts constituting means for maintaining the crank axles against rotation with respect to the frame in selective adjusted position, means for simultaneously shifting said latch bolts out of engagement with the segments, wheels loosely mounted for rotation on the axles, annular ratchets carried by the wheels, pawls pivotally mounted on the crank axles for engagement with the ratchets, levers pivotally mounted on said crank axles, connecting links coupling said levers to the pawls, said ratchets, pawls, levers and connecting links constituting means for effecting the coupling of the wheels to the axles, resilient elements for shifting the levers in a manner to engage the pawls with the ratchets, and means connected with the levers for shifting the same in a manner to disengage the pawls from the ratchets.

2. In an agricultural implement of the character described, a frame, transversely aligned crank axles mounted for rotation on the frame, toothed segments rigidly mounted on the crank axles, interconnected retaining bolts slidably supported on the frame and adapted for engagement with the toothed segments, said segments and interconnected bolts constituting means for locking the crank axles against rotation with respect to the frame in selective adjusted positions, means for simultaneously shifting said latching bolts away from the segments, supporting wheels loosely mounted for rotation on the axles, annular ratchets rigidly mounted on said wheels, pivoted pawls mounted on the crank axles for engagement with the wheels, and interconnected means for simultaneously engaging or disengaging said pawls with the ratchets, said pawls and ratchets constituting means for coupling the wheels to the axles.

3. An implement of the character described comprising a frame, crank axles mounted for swinging adjustment on the frame, supporting wheels journalled on the crank axles, means for connecting the crank axles to the wheels for actuation by said wheels, segments fixed to the crank axles for movement therewith, and means mounted on the frame and engageable with the segments for releasably securing the crank axles against swinging movement and in adjusted position.

4. An implement of the character described comprising a frame, a crank axle mounted for swinging adjustment on the frame, a supporting wheel journalled on the crank axle, means for connecting the crank axle to the wheel for movement with said wheel, a plate fixed to the crank axle for movement therewith, and means engageable with the plate for securing the crank axle in adjusted position.

5. An implement of the character described comprising a frame including spaced side bars, a front cross bar, a rear cross bar and a pair of central bars spaced from the side bars, transversely aligned pairs of bearings on the side and the central bars, crank axles journalled in each pair of bearings, supporting wheels journalled on the crank axles, ratchets fixed to the supporting wheels, toothed segments fixed to the crank axles for movement therewith, a plate mounted transversely on the central bars between the bearings thereon and the front cross bar, bolts slidably mounted on the plate and engageable with the segments for releasably securing the crank axles against swinging movement, manually operable means for disengaging the bolts from the segments, pivoted pawls mounted for movement with the segments about the axes of said segments and engageable with the ratchets in a manner to couple the crank axles to the wheels for actuation by said wheels, and means for manually actuating the pawls in one direction.

6. An implement of the character described comprising a frame including spaced, parallel side bars, a plurality of parallel cross bars connected at their ends to the side bars at spaced points on said side bars and a pair of longitudinally extending central bars disposed in spaced parallelism to the side bars and connected to intermediate portions of the cross bars, transversely aligned pairs of bearings mounted on the side bars and the central bars between certain of the cross bars and spaced therefrom, crank axles journalled in the pairs of bearings, supporting wheels journalled on the crank axles, ratchets fixed to the wheels, toothed segments fixed to the crank axles for movement therewith, a plate mounted transversely on the central bars and extending laterally from said central bars, bolts slidably mounted on the plate for engagement with the segments for releasably securing the crank axles against movement relative to the frame, a rod connecting the bolts together, a lever pivotally mounted on the central bars and operatively connected to the rod for operating the bolts simultaneously, pawls pivotally mounted on the crank axles and engageable with the ratchets for locking the wheels to the crank axles, levers pivotally mounted on the crank axles and operatively connected to the pawls, a bar rigidly connecting the last named levers together for movement in unison and coil springs connected with the last named levers and with the frame for yieldingly urging said last named levers in one direction.

In testimony whereof I affix my signature.

BRUNO W. WILLIG.